United States Patent [19]

Dence

[11] Patent Number: 4,570,322
[45] Date of Patent: Feb. 18, 1986

[54] ADAPTER FOR MOUNTING AN EXHAUST MUFFLER TO AN INTERNAL COMBUSTION ENGINE AND METHOD FOR INSTALLING SAME

[76] Inventor: William R. Dence, 10534-52nd Ave. N., St. Petersburg, Fla. 33708

[21] Appl. No.: 562,172

[22] Filed: Dec. 16, 1983

[51] Int. Cl.⁴ .......................... B23P 7/00; F01N 7/18; F16L 5/00
[52] U.S. Cl. .............................. 29/402.17; 29/402.11; 29/402.12; 29/402.15; 29/402.02; 181/243; 285/15; 285/220; 285/221
[58] Field of Search ...................... 29/557, 558, 527.1, 29/527.2, 527.4, 401.1, 402.14, 402.18, 402.19, 402.21, 402.01, 401, 402.03, 402.09, 402.11, 402.12, 402.13, 402.15, 402.17, 402.16, 402.02, 402.04, 402.05, 402.06, 402.07, 402.08; 181/243; 285/219, 221, 392, 189, 220, 15

[56] References Cited

U.S. PATENT DOCUMENTS

| | | | |
|---|---|---|---|
| 1,520,705 | 12/1924 | Farmer | 285/219 X |
| 1,798,596 | 3/1931 | Fahrney | 285/189 |
| 1,839,248 | 1/1932 | Morley et al. | 285/221 |
| 2,657,078 | 10/1953 | Virgil | 285/15 |
| 2,733,668 | 2/1956 | Pfetzing | 285/189 X |
| 2,897,842 | 8/1959 | Smith | 285/220 X |
| 4,140,337 | 2/1979 | Arcella et al. | 285/219 |
| 4,184,564 | 1/1980 | Trainor | 181/243 |
| 4,316,523 | 2/1982 | Boretti | 181/243 |

Primary Examiner—Howard N. Goldberg
Assistant Examiner—Vernon K. Rising
Attorney, Agent, or Firm—Stanley M. Miller

[57] ABSTRACT

An adapter is disclosed for mounting an exhaust muffler onto a threaded exhaust port located at the external surface of an internal combustion engine. The adapter includes a hollow, cylindrical neck portion having screw threads formed on a first end thereof and circumferentially about the outer surface thereof, for threadably engaging the threaded exhaust port of the internal combustion engine. The adapter further includes a plate portion formed on a second end of the neck portion, having a central opening coincident with the hollow interior of the neck portion, with a first face proximate to the screw threads and a second face opposite to the first face. The adapter forms a seal between the external surface of the internal combustion engine and the first surface of the plate portion when the neck portion is operatively engaged with the exhaust port. The plate portion includes at least two threaded holes opening onto the second face, each hole for threadably engaging a corresponding threaded mounting bolt of an exhaust muffler which is to be mounted onto the second face of the plate so that an inlet port of the muffler is coincident with the central opening in the plate. In this manner, exhaust gases exiting from the exhaust port of the internal combustion engine can be conducted through the neck and plate portions of the adapter, into the exhaust muffler.

20 Claims, 2 Drawing Figures

ADAPTER FOR MOUNTING AN EXHAUST MUFFLER TO AN INTERNAL COMBUSTION ENGINE AND METHOD FOR INSTALLING SAME

FIELD OF THE INVENTION

The invention disclosed broadly relates to accessories for internal cumbustion engines and more particularly relates to improvements in the mounting of exhaust mufflers to internal combustion engines.

BACKGROUND OF THE INVENTION

Internal combustion engines have become widely used for driving the blades of mowers and other lawn and garden implements. The pressure of the exhaust gases as they are emitted from the exhaust port of the engine produces a loud report, so it has become customary to equip such engines with an exhaust muffler which will help absorb the acoustical emissions during operation. The acoustical suppression has been further enhanced in some embodiments by placing the exhaust muffler below the deck of the lawn mower above the rotating blade. The problem with this embodiment is that rocks or other debris thrown up by the blade can break off the muffler from its mounting on the engine. Conventionally, exhaust mufflers are bolted onto the engine by means of one or more more threaded bolts which pass through the body of the muffler and threadably engage the external wall of the engine adjacent to the exhaust port. When the muffler is broken off, it is the mounting bolts which usually are broken off from the engine with a portion the the threaded end of the bolt remaining fastened in the engine wall. In order to repair the muffler mounting, the engine must be removed from the deck of the mower and the remaining portion of the broken bolts laboriously worked out from the engine wall. This is a time consuming procedure at best and can sometimes result in further damage to the engine wall.

OBJECTS OF THE INVENTION

It is therefor an object of the invention to repair a broken mounting for an exhaust muffler on an internal combustion engine in an improved manner.

It is another object of the invention to provide an inproved mounting for an exhaust muffler on a internal cumbustion engine.

SUMMARY OF THE INVENTION

These and other objects, features and advantages of the invention are accomplished by the adapter disclosed herein. An adapter is disclosed for mounting an exhaust muffler onto a threaded exhaust port located at the external surface of an internal combustion engine. The adapter includes a hollow, cylindrical neck portion having screw threads formed on a first end thereof and circumfrentially about the outer surface thereof, for threadably engaging the threaded exhaust port of the internal combustion engine. The adapter further includes a plate portion formed on a second end of the neck portion, having a central opening coincident with the hollow interior of the neck portion, with a first face proximate to the screw threads and a second face opposite to the first face. The adapter forms a seal between the external surface of the internal combustion engine and the first surface of the plate portion when the neck portion is operatively engaged with the exhaust port. The plate portion includes at least two threaded holes opening onto the second face, each hole for threadably engaging a corresponding threaded mounting bolt of an exhaust muffler which is to be mounted onto the second face of the plate so that an inlet port of the muffler is coincident with the central opening in the plate. In this manner, exhaust gases exiting from the exhaust port of the internal combustion engine can be conducted through the neck and plate portions of the adapter, into the exhaust muffler.

A method for repairing the broken bolt mounting of an exhaust muffler on the exhaust port located at the external surface of an internal combustion engine, is also disclosed. The method starts with the step of grinding the broken bolt mounting so as to be substantially flush with the external surface of the internal combustion engine. The method further includes the step of cutting female screw threads into the wall of the exhaust port opening onto the external surface of the internal combustion engine. The method proceeds to the next step of threadably mounting a hollow, cylindrical neck portion of a muffler adapter onto the female screw threads. The method further includes the step of forming a seal between the external surface of the internal combustion engine and the first surface of the plate portion by compressing a gasket therebetween when the neck portion is operatively engaged with the exhaust port. The method then goes to the next step of threadably engaging each hole of the plate with a corresponding threaded mounting bolt of an exhaust muffler which is to be mounted onto the second face of the plate so that an inlet port of the muffler is coincident with the central opening in the plate. In this manner, the broken mounting can be repaired so that the muffler can be remounted onto the exhaust port of the internal combustion engine.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
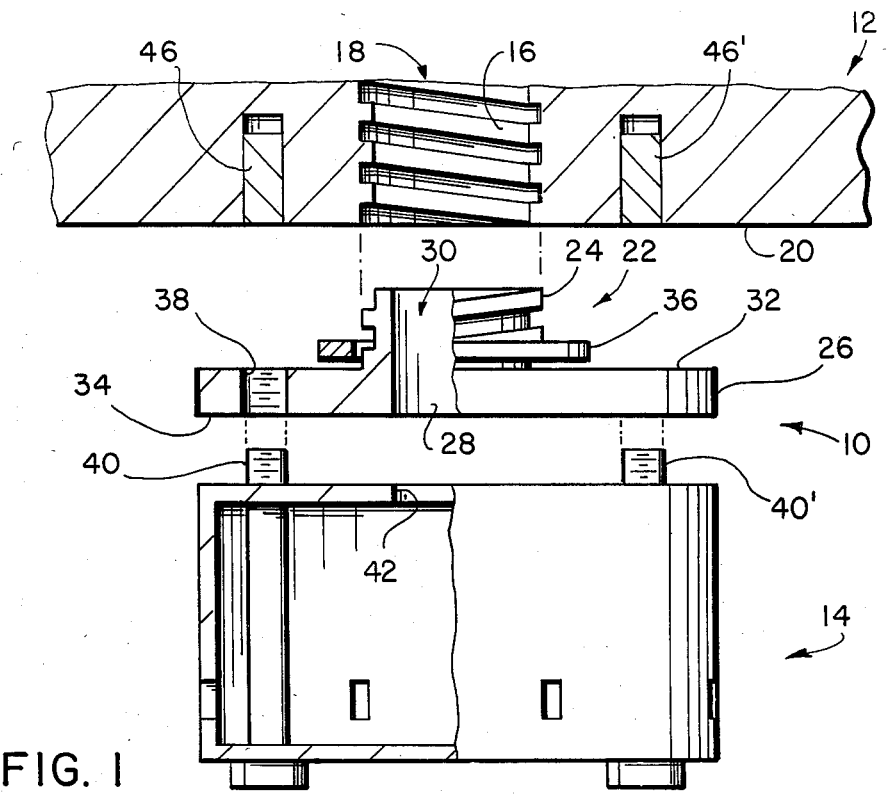
FIG. 1 is a side, break-away, exploded view of the adapter invention 10 and how it is arranged with respect to the internal combustion engine 12 and the exhaust muffler 14.
Figure 2:
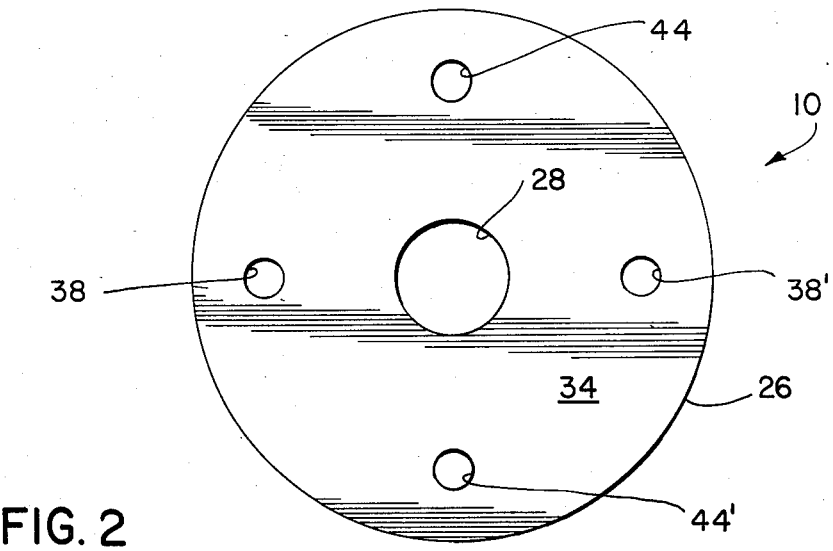
FIG. 2 is a front view of the adapter invention 10, showing the plate portion 26.

FIGS. 1 and 2 show the adapter 10 for mounting an exhaust muffler 14 onto the threads 16 of a threaded exhaust port 18 located at the external surface 20 of an internal combustion engine 12.

FIG. 1 shows the hollow, cylindrical neck portion 22 having screw threads 24 formed on a first end thereof and circumfrentially about the outer surface thereof, for threadably engaging the threads 16 of the exhaust port 18 of the internal combustion engine 12.

FIGS. 1 and 2 show the plate portion 26 formed on a second end of the neck portion 22, having a central opening 28 coincident with the hollow interior 30 of the neck portion 22, with a first face 32 proximate to the screw threads 24 and a second face 34 opposite to the first face 32.

FIG. 1 shows an annular gasket 36 mounted on the neck portion 22, forming a seal between the external surface 20 of the internal combustion engine 12 and the first surface 32 of the plate portion 26 when the neck portion 22 is operatively engaged with the exhaust port 18.

FIGS. 1 and 2 show the plate portion 26 including at least two threaded holes 38 and 38' opening onto the second face 34, each hole for threadably engaging a corresponding threaded mounting bolt 40 and 40', respectively, of an exhaust muffler 14 which is to be mounted onto the second face 34 of the plate 26 so that an inlet port 42 of the muffler 14 is coincident with the central opening 28 in the plate 26.

In this manner, exhaust gases exiting from the exhaust port 18 of the internal combustion engine 12 can be conducted through the interior 30 of the neck portion 22 and the central opening 28 of the plate portion 26 of the adapter 10, and through the inlet port 42 of the exhaust muffler 14.

The neck portion 22 and the plate portion 26 of the adapter 10 can be composed of a metal selected from the group consisting of steel and stainless steel.

The gasket 36 can be composed of a ductile metal selected from the group consisting of copper, brass, bronze, lead and a laminar composite of copper and asbestos.

There can be four threaded holes disposed about the periphery of the plate portion 26. The first pair of the threaded holes 38 and 38' can have a first dimension and the second pair of the threaded holes 44 and 44' can have a second dimension. The different dimensions can be different hole diameters in order to accomodate different sized bolts or the different dimensions can be different radial distances from the center of the plate 26 in order to accomodate different models of mufflers 14.

As is seen in FIG. 2, the plate portion 26 can have a generally circularly shaped periphery.

The plate portion 26 and the neck portion 22 can be made of metal and are welded together into a unitary structure. Alternately, the plate portion 26 and the neck portion 22 are integrally formed from a single metal casting.

In accordance with the invention, the method for repairing the broken bolt mounting of an exhaust muffler on the exhaust port 18 located at the external surface 20 of the internal combustion engine 12, can be carried out with the following steps.

The first step is grinding the broken bolts 46 and 46' in FIG. 1 so as to be substantially flush with the external surface 20 of the internal combustion engine 12.

The second step is cutting the female screw threads 16 into the wall of the exhaust port 18 opening onto the external surface 20 of the internal combustion engine 12.

The third step is threadably mounting the hollow, cylindrical neck portion 22 of the muffler adapter 10 onto the female screw threads 16.

The fourth step is forming a seal between the external surface 20 of the internal combustion engine 12 and the first surface 32 of the plate portion 26 by compressing the gasket 36 therebetween when the neck portion 22 is operatively engaged with the exhaust port 18.

The fifth step is threadably engaging each hole 38 and 38' of the plate 26 with a corresponding threaded mounting bolt 40 and 40', respectively, of the exhaust muffler 14 which is to be mounted onto the second face 34 of the plate 26 so that the inlet port 42 of the muffler 14 is coincident with the central opening 28 in the plate 26.

In this manner, the broken mounting can be repaired so that the muffler can be remounted onto the exhaust port of the internal combustion engine.

Although a specific embodiment of the invention has been disclosed, it will be understood by workers having skill in the art that changes can be made to the dimensions, composition, and other details of the disclosed structure without departing from the spirit and the scope of the invention.

What is claimed is:

1. An adapter for mounting an exhaust muffler onto a threaded exhaust port located at the external surface of an internal combustion engine, comprising:

a hollow, cylindrical neck portion having screw threads formed on a first end thereof and circumferentially about the outer surface thereof, for threadably engaging said threaded exhaust port of said internal combustion engine;

a plate portion formed on a second end of said neck portion, having a central opening coincident with said hollow interior of said neck portion, with a first face proximate to said screw threads and a second face opposite to said first face;

an annular gasket mounted on said neck portion, forming a seal between said external surface of said internal combustion engine and said first surface of said plate portion when said neck portion is operatively engaged with said exhaust port;

said plate portion including at least two threaded holes opening onto said second face, each hole for threadably engaging a corresponding threaded mounting bolt of an exhaust muffler which is to be mounted onto said second face of said plate so that an inlet port of said muffler is coincident with said central opening in said plate;

whereby exhaust gases exiting from said exhaust port of said internal combustion engine can be conducted through said neck portion and said plate portion of the adapter, into said exhaust muffler.

2. The apparatus of claim 1, which further comprises: said neck portion and said plate portion of said adapter being composed of a metal.

3. The apparatus of claim 2, wherein said metal is selected from the group consisting of steel and stainless steel.

4. The apparatus of claim 1, which further comprises: said gasket being composed of a ductile metal.

5. The apparatus of claim 4, wherein said metal is selected from the group consisting of copper, brass, bronze, lead and a laminar composite of copper and asbestos.

6. The apparatus of claim 1, wherein there are four threaded holes disposed about the periphery of said plate portion.

7. The apparatus of claim 6, wherein a first pair of said threaded holes have a first dimension and a second pair of said threaded holes have a second dimension.

8. The apparatus of claim 1, wherein said plate portion has a generally circularly shaped periphery.

9. The apparatus of claim 1, wherein said plate portion and said neck portion are made of metal and are welded together into a unitary structure.

10. The apparatus of claim 1, wherein said plate portion and said neck portion are integrally formed from a single metal casting.

11. A method for repairing the broken bolt mounting of an exhaust muffler on the exhaust port located at the external surface of an internal combustion engine, comprising the steps of:

grinding said broken bolt mounting so as to be substantially flush with said external surface of said internal combustion engine;

cutting female screw threads into the wall of said exhaust port opening onto said external surface of said internal combustion engine;

threadably mounting a hollow, cylindrical neck portion of a muffler adapter onto said female screw threads, said neck portion having screw threads formed on a first end thereof and circumferentially about the outer surface thereof, for threadably engaging said threaded exhaust port of said internal combustion engine;

said adapter further including a plate portion formed on a second end of said neck portion, having a central opening coincident with said hollow interior of said neck portion, with a first face proximate to said screw threads and a second face opposite to said first face;

forming a seal between said external surface of said internal combustion engine and said first surface of said plate portion by compressing a gasket therebetween when said neck portion is operatively engaged with said exhaust port;

said plate portion including at least two threaded holes opening onto said second face;

threadably engaging each said hole of said plate with a corresponding threaded mounting bolt of an exhaust muffler which is to be mounted onto said second face of said plate so that an inlet port of said muffler is coincident with said central opening in said plate;

whereby said broken mounting can be repaired so that said muffler can be remounted onto said exhaust port of said internal combustion engine.

12. The method of claim 11, which further comprises: said neck portion and said plate portion of said adapter being composed of a metal.

13. The method of claim 12, wherein said metal is selected from the group consisting of steel and stainless steel.

14. The method of claim 11, which further comprises: said gasket being composed of a ductile metal.

15. The method of claim 14, wherein said metal is selected from the group consisting of copper, brass, bronze, lead an a laminar composite of copper and asbestos.

16. The method of claim 11, wherein there are four threaded holes disposed about the periphery of said plate portion.

17. The method of claim 16, wherein a first pair of said threaded holes have a first dimension and a second pair of said threaded holes have a second dimension.

18. The method of claim 11, wherein said plate portion has a generally circularly shaped periphery.

19. The method of claim 11, wherein said plate portion and said neck portion are made of metal and are welded together into a unitary structure.

20. The method of claim 11, wherein said plate portion and said neck portion are integrally formed from a single metal casting.

* * * * *